US011417012B2

(12) United States Patent
Panakos et al.

(10) Patent No.: US 11,417,012 B2
(45) Date of Patent: Aug. 16, 2022

(54) ESTIMATION OF POSITION COORDINATES OF LIGHT SOURCES IN IMAGES OF THE SURROUNDING ENVIRONMENT

(71) Applicant: Conti Temic microelectronic GmbH, Nuremberg (DE)

(72) Inventors: Andreas Panakos, Ulm (DE); Martin Buerker, Ulm (DE); Charlotte Gloger, Ulm (DE); Frank Kittmann, Ulm (DE); Moritz Meyers, Ulm (DE); Markus Friebe, Gefrees (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 0 days.

(21) Appl. No.: 16/972,112

(22) PCT Filed: May 22, 2019

(86) PCT No.: PCT/DE2019/200045
§ 371 (c)(1),
(2) Date: Dec. 4, 2020

(87) PCT Pub. No.: WO2019/233533
PCT Pub. Date: Dec. 12, 2019

(65) Prior Publication Data
US 2021/0225023 A1 Jul. 22, 2021

(30) Foreign Application Priority Data
Jun. 4, 2018 (DE) .................... 10 2018 208 739.3

(51) Int. Cl.
G06T 7/70 (2017.01)
G06T 5/00 (2006.01)
G06T 5/20 (2006.01)

(52) U.S. Cl.
CPC ............... G06T 7/70 (2017.01); G06T 5/007 (2013.01); G06T 5/20 (2013.01)

(58) Field of Classification Search
CPC . G06T 5/009; G06T 2207/10016; G06T 7/70; G06T 7/85; G06T 7/90;
(Continued)

(56) References Cited

U.S. PATENT DOCUMENTS 9,912,847 B1 * 3/2018 Yuan .................... H04N 5/2351
2012/0038751 A1 * 2/2012 Yuan .................. H04N 5/23232
348/51

(Continued)

FOREIGN PATENT DOCUMENTS

DE  102011122454        6/2013
DE  102011122454 A1 *  6/2013  ......... G06K 9/00791
EP  2 791 911           8/2017

OTHER PUBLICATIONS

Monocular Vision-Based Collision Avoidance System using Shadow Detection (Year: 2013).*
(Continued)

Primary Examiner — Nizar N Sivji
(74) Attorney, Agent, or Firm — RatnerPrestia

(57) ABSTRACT

A method includes the steps: a) capturing image of an environment surrounding a vehicle by a camera; b) determining an area of increased brightness in the image based on pixels having a brightness exceeding a predefined threshold; c) estimating position coordinates of a light source in the environment from the area of increased brightness; d) detecting a shadow of the vehicle in the image; and e) determining a type of the light source as a spot light source or a direction light source from the shadow, environment.

17 Claims, 5 Drawing Sheets

(58) Field of Classification Search
CPC ........... G06T 5/005; G06T 2207/30252; G06T 5/007; G06T 5/20; G06T 2207/20024
See application file for complete search history.

(56) References Cited

U.S. PATENT DOCUMENTS

| | | | |
|---|---|---|---|
| 2015/0029192 A1* | 1/2015 | Free | G06K 9/00241 345/426 |
| 2015/0098612 A1* | 4/2015 | Sato | G06K 9/00825 382/103 |
| 2015/0310284 A1* | 10/2015 | Sakamoto | G06K 9/4604 701/41 |
| 2016/0042531 A1* | 2/2016 | Nolan | H05B 47/29 348/135 |
| 2016/0098840 A1* | 4/2016 | Allano | G06T 5/50 345/426 |
| 2016/0209927 A1* | 7/2016 | Yamagishi | G06F 3/0304 |
| 2018/0134289 A1 | 5/2018 | Kokido et al. | |
| 2018/0144199 A1* | 5/2018 | Perez Barrera | G06K 9/00805 |
| 2018/0350098 A1* | 12/2018 | Siessegger | G06T 7/50 |

OTHER PUBLICATIONS

Pedestrian Detection and Tracking from Low-Resolution Unmanned Aerial Vehicle Thermal Imagery (Year: 2016).*

English translation of the International Search Report of the International Searching Authority for International Application PCT/DE2019/200045, dated Aug. 12, 2019, 2 pages, European Patent Office, HV Rijswijk, Netherlands.

PCT International Preliminary Report on Patentability including English Translation of PCT Written Opinion of the International Searching Authority for International Application PCT/DE2019/200045, dated Dec. 8, 2020, 7 pages, International Bureau of WIPO, Geneva, Switzerland.

German Search Report for German Patent Application No. 10 2018 208 739.3, dated Apr. 11, 2019, 8 pages, German Patent and Trademark Office, Muenchen, Germany, with English partial translation, 6 pages.

F.S. Hill, Jr., Computer Graphics, Sections 1.1 to 1.3, and 4.6.1 to 4.7; (excerpt for ECE660, Sep. 23, 1999), retrieved from the internet on Apr. 10, 2019: https://de.scribd.com/doc/235218526/Computer-Graphics-With-Using-Opengl; pp. 1, 2, 155 to 159 (republished pp. 1, 2, 37 to 40).

* cited by examiner

ESTIMATION OF POSITION COORDINATES OF LIGHT SOURCES IN IMAGES OF THE SURROUNDING ENVIRONMENT

FIELD OF THE INVENTION

The invention relates to a device and a method for estimating position coordinates and the type of light sources in images of the surrounding environment, in particular in images of the surrounding environment of a surround-view camera in vehicles. Furthermore, the invention relates to a program element and a computer-readable medium.

BACKGROUND INFORMATION

Methods for estimating position coordinates of light sources in images of the surrounding environment are, for example, used in order to compile an image which is as realistic as possible of the surrounding environment in so-called augmented reality applications. More recently, these methods are used in particular in land vehicles, in order to convey a rapid and intuitive image of his surrounding environment to the driver, in which the elements of augmented reality are displayed. That is to say, a photo-realistic image of the surrounding environment is required, which is calculated in real time—including at high speeds of the vehicle. The estimation of position coordinates and the type of light sources in images of the surrounding environment play a particular role in this. Two- or three-dimensional models of the location of each light source are understood to be position coordinates. In a number of embodiments, position coordinates are understood to be the direction of each light source. Spot light sources or direction light sources are understood to be the type of light source. Direction light sources ("directional illumination sources") are typically very distant light sources, e.g. the sun. Spot light sources ("point illumination sources") are light sources which are arranged closer, e.g. street lamps.

Methods in the prior art require a very high amount of computational power for these calculations. Furthermore, a plurality of methods are only able to consider a single light source which is deemed to be a main light source. Many methods additionally require reference objects in order to estimate position coordinates of one or more light sources.

SUMMARY OF THE INVENTION

Against this backdrop, it is an object of the invention to at least partially overcome the disadvantages of the prior art. This object can be achieved by a method according to the invention as set forth herein.

The invention comprises a method for estimating position coordinates and the type of a light source in images of the surrounding environment, wherein the type of light source can be a spot light source or a direction light source. The method comprises the following steps:

a) Capturing a surrounding environment in the form of an image of the surrounding environment by means of a camera. In a number of embodiments, the image of the surrounding environment is, in particular in the case of moving land vehicles, acquired at regular temporal intervals. The vehicle can move between the individual acquisitions. In a number of embodiments, this is considered in that the calculated augmented reality images are interpolated in a suitable manner, in particular considering the speed of the vehicle. The described method is applied to each individual image of the surrounding environment. The image of the surrounding environment is temporarily stored, for example, in a primary memory of a control unit or of a computer. In a number of embodiments, this computer is located in the vehicle or is connected to the vehicle.

b) Determining areas of increased brightness of the image of the surrounding environment, specifically of an amount (i.e. a quantity or number) of pixels, the brightness of which exceeds a predefined threshold. The predefined threshold can be fixed or variable. In an embodiment, the threshold of the total brightness or the maximum brightness of the image of the surrounding environment is determined. This can in particular be the case with images of the surrounding environment, which have been acquired after sundown.

The captured image of the surrounding environment is subsequently analyzed as to whether the amount of pixels is contiguous or discontiguous. If the amount of pixels is contiguous, this is then deemed to be a (contiguous) area of increased brightness. If the amount of pixels is discontiguous, it is then assumed that the captured image of the surrounding environment has multiple separate light sources. If this is the case, the following steps are then applied to each individual light source. In a number of embodiments, a minimum distance between discontiguous pixels is predefined, so that discontiguous pixels only lead to the assumption of multiple, separate light sources as of this minimum distance.

c) Determining position coordinates of the light source from the areas of increased brightness, according to a first calculation method. The areas of increased brightness have an edge which is determined by the predefined threshold of the brightness. In a number of embodiments, the edge between a pixel which exceeds the threshold and a neighboring pixel which falls short of the threshold can be determined. In the case of a number of embodiments, the edge can be smoothed.

Following the calculation of the edge of the areas of increased brightness, according to a first calculation method, the middle of the areas of increased brightness is determined. The first calculation method can, for example, determine the geometric center (centroid) of each area of increased brightness or can use a secant method or another method in order to calculate the midpoint of each area. This midpoint or center is viewed as position coordinates of the light source.

d) Determining the type of light source from the shadow of an object, in particular a vehicle, on the image of the surrounding environment. After calculating the position coordinates of each light source, the shadows of the image of the surrounding environment are analyzed. The camera can be arranged on the object which is casting shadows. This object can in particular be a vehicle. A shadow is assigned to each light source. Furthermore, the type of light source is determined from the form of the shadow, for example from the parallelism of the edges.

This type of calculation is particularly advantageous, because the results thus obtained, specifically the knowledge of both the position coordinates of each light source and their type, lead to a particularly realistic modelling of augmented reality images. It is, in addition, advantageous that not only can a single main light source be considered with this method, but also multiple light sources. In particular, an omnidirectional image of the surrounding environment is no longer necessarily required as a basis for this method. Furthermore, these results can be obtained with a lower computational cost—i.e. a shorter computation time or with a slower processor. Elaborate modellings of the surrounding environment and/or the use of databases with known objects is/are additionally dispensed with.

In an embodiment, the invention has an additional step: e) Applying a smoothing filter, in particular a Kalman filter, to the position coordinates of the light source.

This is in particular advantageous in order to at least partially compensate for erroneous estimations from the preceding method steps. This step can additionally be advantageously utilized if a (e.g. temporal) sequence of images of the surrounding environment exists, e.g. if the camera is arranged on or in a vehicle which is moving. A further advantage of the method is that it can also be used to calculate non-static scenes.

In an embodiment, the camera consists of a plurality of cameras and is in particular a surround-view camera. For example, four cameras can be arranged on or in a vehicle in an embodiment. The arrangement can provide one camera each for each side (on the left, on the right, at the front, at the rear). The cameras do not have to be arranged at an angle of precisely 90°. The advantage of this embodiment is that the position coordinates of the light source can be calculated as three-dimensional coordinates. In addition, the cameras can be used in their overlapping region in order to correct the image of the surrounding environment of the other camera in each case.

In an embodiment, one of the steps b), c), d) or e) is carried out multiple times. In an embodiment, these steps are applied to a multiplicity of light sources.

In an embodiment, the areas of increased brightness of the image of the surrounding environment are white-saturated. The value "white-saturated" is the highest brightness value of the color scale used, that is to say for example the hexadecimal value "FF" in the case of a pure grayscale or "FFFFFF" in the case of a RGB scale. These values are avoided in the prior art in some algorithms, because these values can lead to difficulties in some algorithms and/or can cause higher computation times. However, in the case of the present invention, the use of the value "white-saturated" leads to a simplification—and, thus, to a further acceleration—of the calculations.

In an embodiment, step c) has the following sub-steps:
c1) selecting three pixels at the edge of the areas of increased brightness;
c2) connecting two pixels each, from the three pixels, by a first and a second straight line;
c3) forming a first and a second normal through the middle of the first and the second straight line;
c4) determining the position coordinates of the light source from an intersection of the first and the second normal.

In an embodiment, step d) has the following sub-steps:
d1) assigning the shadow to the light source from the edges of the shadow of the object and the position coordinates of the light source.
d2) determining, from the parallelism of the edges of the shadow, the type of light source, specifically a direction light source from parallel edges and a spot light source from non-parallel edges.

The invention also comprises a control unit which is connected to the camera and which is designed to carry out the indicated method. If the camera or the cameras is/are located on a vehicle, the control unit can likewise be located in the vehicle. However, a part of the computational power can also be outsourced, e.g. to an external server.

The invention also comprises a program element which, if it is run on the indicated control unit, instructs the control unit to carry out the indicated method.

The invention moreover comprises a computer-readable medium, on which the indicated program element is stored.

BRIEF DESCRIPTION OF THE DRAWINGS

The invention is described below on the basis of drawings of specific embodiments which, it should be understood, are primarily intended to clarify, but not restrict, the invention, wherein:

FIG. 1a schematically shows an overview of a possible setting, in which the indicated method is applied. The surrounding environment 100 has three light sources 120, 125, 128. The light source 120 is sketched as the sun, i.e. as a direction light source, the light sources 125 and 128 are sketched as spot light sources. Furthermore, the surrounding environment 100 has a vehicle 150, on which four cameras 200 are arranged. A control unit 400 is additionally arranged in the vehicle 150, which control unit is connected to the cameras via one connection 420 each. The vehicle 150 casts a shadow 350 which is caused by the first light source 120. The shadows of the second light sources 125 and 128 are not represented here.

FIG. 1b shows an example of calculating position coordinates of a light source from an image 300 of the surrounding environment, which has been acquired by the four cameras 200. The cameras 200 are not usually visible in an image 300 of the surrounding environment; these have only been inserted here for illustration purposes. One way of calculating position coordinates is shown using the first light source 120. Here, the areas of increased brightness 310 of the first light source 120 have, for example, the value "white-saturated". Three pixels 331, 332, 333 are selected from the edge 330 of the areas of increased brightness 310 and two of them are each connected with straight lines 341, 342. The perpendicular is dropped onto the middle of these straight lines 341, 342 or the normals 346, 347 are constructed. The intersection 335 of the normals 346 and 347 is the calculated middle 335 of the areas of increased brightness 310. In connection with this, the fact that two cameras 200 have captured the first light source 120 can advantageously be utilized. This means that it is possible to determine three-dimensional position coordinates of the first light source 120.

Figure 1A:
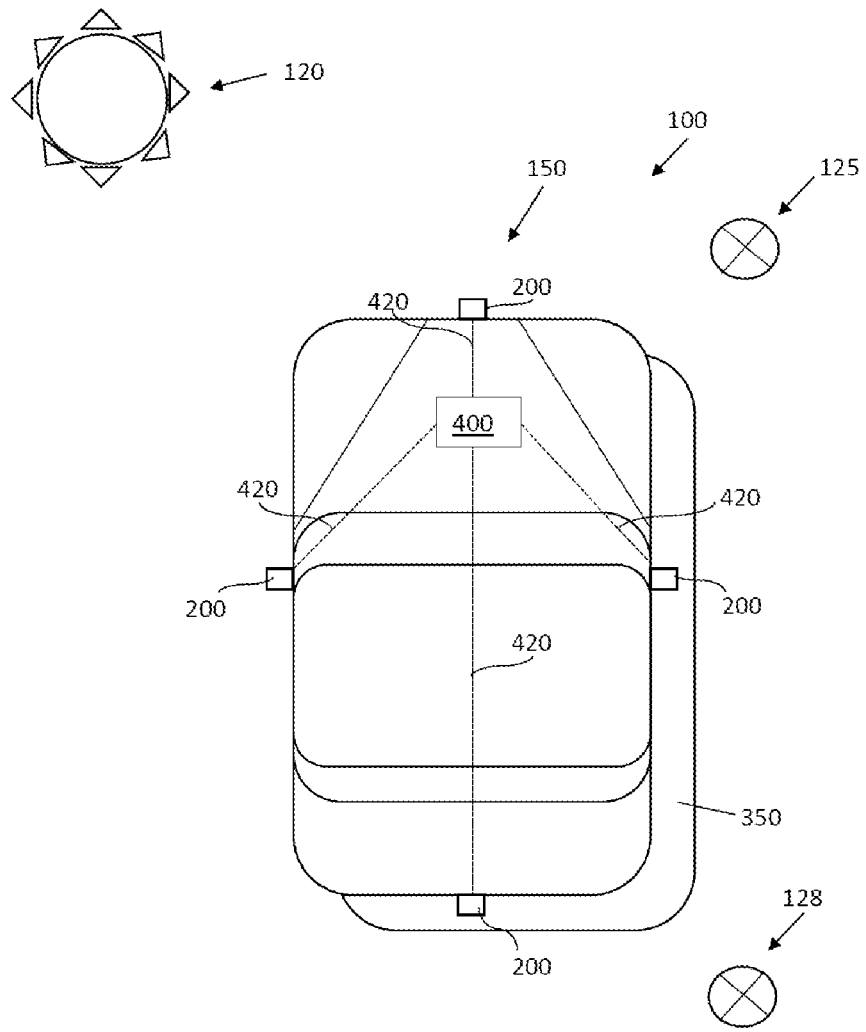
FIG. 1a schematically shows a possible setting, in which the indicated method is applied.
Figure 1B:
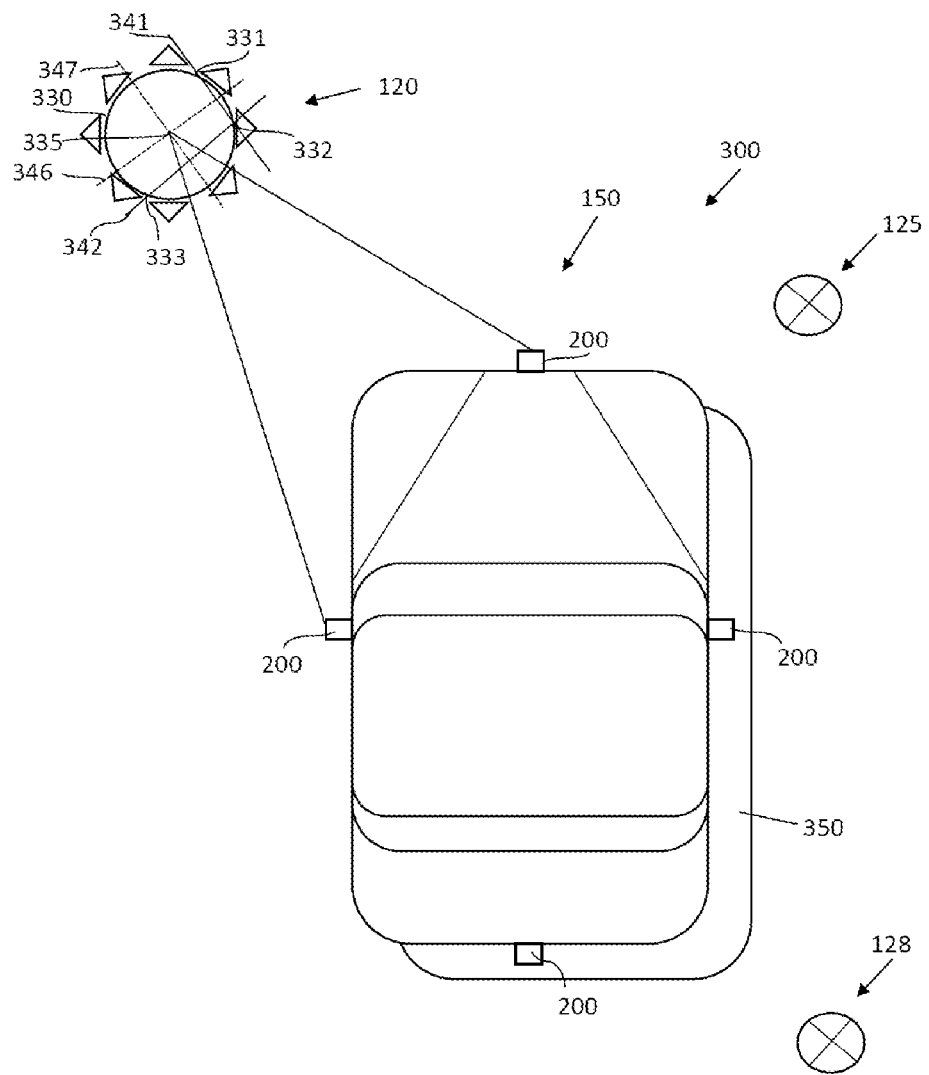
FIG. 1b schematically shows an example of calculating position coordinates of a light source from an image of the surrounding environment.

This method can also be applied to the second light sources 125 and 128. The position coordinates of the light sources 120, 125, 128 are therefore calculated from the image 300 of the surrounding environment in FIG. 1b.

Figure 1C:
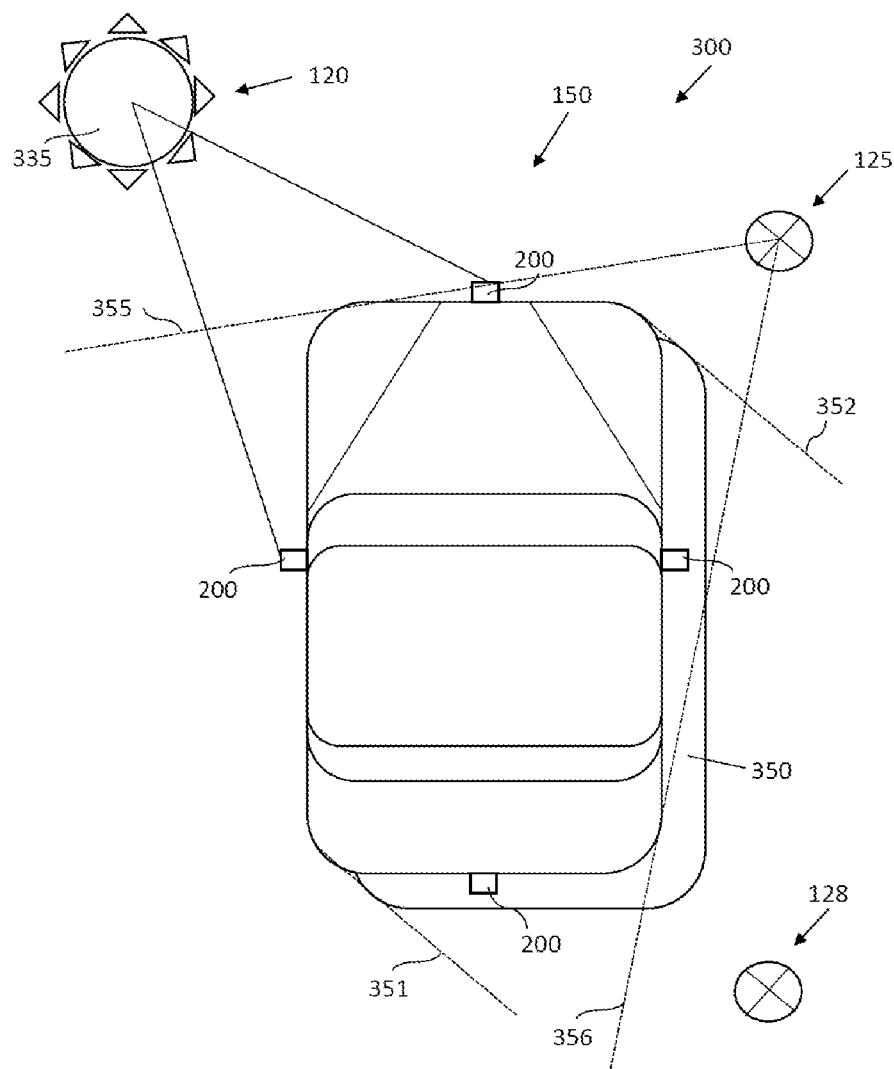
FIG. 1c schematically shows an example of calculating the type of a light source.

FIG. 1c shows an example of calculating the type of a light source from the image 300 of the surrounding environment. The shadow 350 is first assigned to the first light source 120, the midpoint 335 of which has already been calculated. The shadow 350 has the edges 351, 352. It is clearly visible that the edges 351, 352 are parallel. The result of the calculation is that the first light source 120 is a direction light source.

The shadow which is cast by the second light source 125—and, similarly, also by the second light source 128, obviously has different edges 355, 356. Since these edges 355, 356 are not parallel and the edges 355, 356 can be assigned to the second light source 125, this second light source 125 can be identified as a spot light source. Similarly, the second light source 128 is also identified as a spot light source (shadow not represented).

Figure 2:
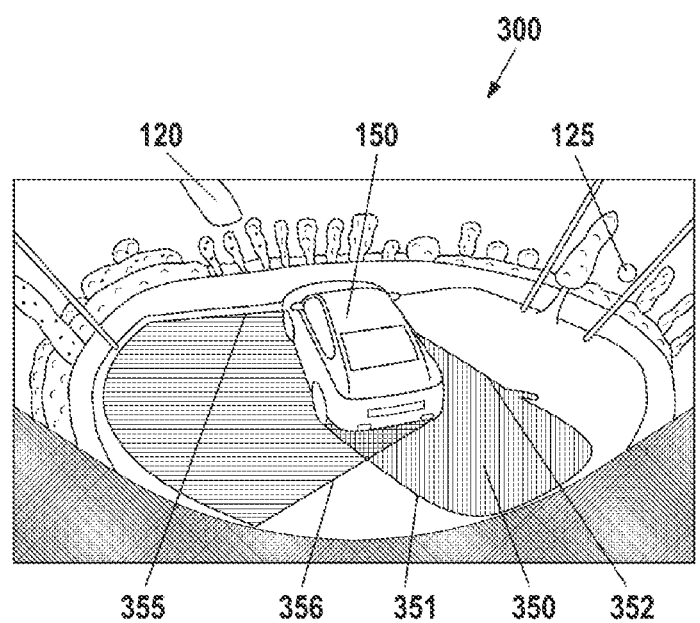
FIG. 2 shows an example of an image of the surrounding environment which has been acquired with a surround-view camera.

FIG. 2 shows an example of an image 300 of the surrounding environment, which has been acquired with a surround-view camera. A first light source 120 and a second light source 125 are clearly visible. The first light source 120 has a brightness value "white-saturated". It is also visible that the areas of increased brightness, which are formed by the first light source 120, do not necessarily have to be a circle, in order to be able to carry out the first calculation method. Furthermore, a vehicle 150 is visible in the image 300 of the surrounding environment. The vehicle 150 casts a shadow 350 which is caused by the first light source 120. The shadow 350 has the edges 351, 352. It is clearly visible that the edges 351, 352 are parallel. In addition to the position coordinates of the light source, the calculation therefore reveals that the first light source 120 is a direction light source.

The shadow which is cast by the second light source 125 has the edges 355, 356. Since these edges 355, 356 are not parallel and these edges 355, 356 can be assigned to the second light source 125, said second light source 125 can be identified as a spot light source.

Figure 3:
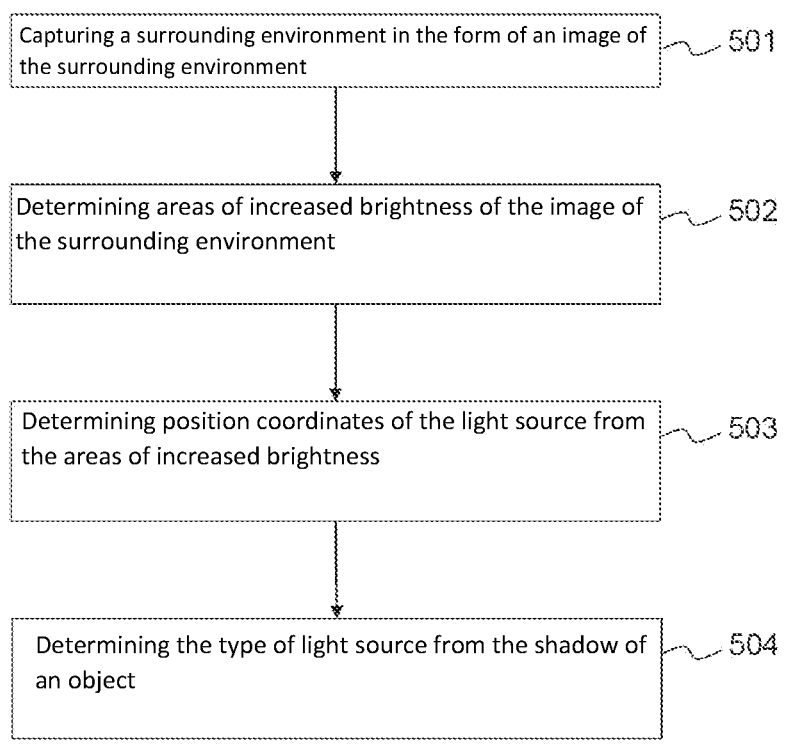
FIG. 3 shows an example of a method for calculating position coordinates and the type of a light source.

FIG. 3 shows an example of a method for calculating position coordinates and the type of a light source.

A surrounding environment 100 in the form of an image 300 of the surrounding environment is captured in a first step 501. This is effected by means of a camera 200. Said camera 200 can also be executed as a surround-view camera and can comprise multiple physical cameras 200 which are subsequently combined to produce a total image 300 of the surrounding environment.

In a second step 502, the areas of increased brightness 310 of the image 300 of the surrounding environment are determined, specifically an amount of pixels, the brightness of which exceeds a predefined threshold. In an embodiment, the areas of increased brightness 310 of the image of the surrounding environment can be white-saturated. If multiple light sources 120, 125, 128 are imaged in the image 300 of the surrounding environment, then the areas of increased brightness 310 are determined for each individual light source 120, 125, 128.

In a third step 503, the position coordinates 335 of each individual light source 120, 125, 128 are determined from the areas of increased brightness 310, according to a first calculation method. The first calculation method can, for example, determine the geometric center of each area of increased brightness or can use a secant method or another method for calculating the midpoint of each area. This midpoint or center is viewed as the position coordinates of the light source.

In a fourth step 504, the type of light source 120, 125, 128 is determined from the shadow 350 of a vehicle 150. That is to say, after the position coordinates of each light source are calculated, the shadows of the image of the surrounding environment are analyzed. The camera can be arranged on the object which is casting shadows. This object can in particular be a vehicle. A shadow is assigned to each light source 120, 125, 128. Furthermore, the type of light source is determined from the form of the shadow, for example from the parallelism of the edges.

In addition, it is pointed out that "comprising" and "having" do not exclude any other elements or steps and the indefinite article "a" does not exclude a plurality. It is additionally pointed out that features or steps, which have been described with reference to one of the above exemplary embodiments, can also be used in combination with other features or steps of other exemplary embodiments described above. Reference numerals in the claims are not to be deemed to be restrictions.

LIST OF REFERENCE NUMERALS

100 Surrounding environment
120 First light source
125, 128 Second light sources
150 Vehicle
200 Camera
300 Image of the surrounding environment
320, 322, 324 Areas of increased brightness
330 Edge of the areas of increased brightness
331, 332, 333 Pixel from the edge
335 Calculated middle of the areas of increased brightness
341, 342 Straight lines
346, 347 Normals
350 Shadow of the first light source
351, 352 Edge of the shadow of the first light source
355, 356 Edge of the shadow of the second light source
400 Control unit
420 Camera—control unit connection
501 to 504 Steps of the method

The invention claimed is:

1. A method comprising steps:
   a) capturing an image of an environment surrounding a vehicle by a camera arrangement mounted on the vehicle;
   b) in the image, determining at least one area of increased brightness comprising a plurality of pixels having a brightness exceeding a predefined threshold;
   c) estimating position coordinates of a light source in the environment from the at least one area of increased brightness in the image, comprising sub-steps:
      c1) among the plurality of pixels, selecting three selected pixels at an edge of the at least one area of increased brightness,
      c2) connecting a first pair of the three selected pixels with one another by a first straight line, and connecting a second pair of the three selected pixels with one another by a second straight line,
      c3) forming a first normal through a center of the first straight line, and forming a second normal through a center of the second straight line,
      c4) estimating the position coordinates of the light source from an intersection of the first normal and the second normal;
   d) detecting a shadow of the vehicle in the image; and
   e) estimating a type of the light source as a spot light source or a direction light source from the shadow in the image.

2. The method according to claim 1, further comprising applying a Kalman smoothing filter to the position coordinates of the light source.

3. The method according to claim 1, wherein the camera arrangement is a surround-view camera arrangement comprising a plurality of cameras, and the image is a surround-view image.

4. The method according to claim 1, further comprising repeating the steps b) and c) or the steps d) and e) with respect to another light source in the environment.

5. The method according to claim 1, wherein the at least one area of increased brightness of the image is white-saturated.

6. The method according to claim 1, wherein the step e) comprises sub-steps:
- e1) assigning the shadow to the light source based on edges of the shadow and the position coordinates of the light source,
- e2) determining a parallelism of the edges of the shadow, and
- e3) estimating the type of the light source from the parallelism of the edges of the shadow, wherein the type is estimated as the direction light source based on the edges of the shadow being parallel and the type is estimated as the spot light source based on the edges of the shadow being non-parallel.

7. The method according to claim 1, further comprising generating data indicative of the position coordinates and the type of the light source, using the data in compiling an output image representing the surrounding environment, and outputting the output image to a driver of the vehicle.

8. A control unit connected to the camera arrangement and configured to carry out the method according to claim 1.

9. A non-transitory computer-readable medium, on which is stored a program configured to cause the method according to claim 1 to be carried out when the program is executed on a control unit.

10. A method comprising steps:
- a) capturing an image of an environment surrounding a vehicle by a camera arrangement mounted on the vehicle;
- b) in the image, determining at least one area of increased brightness comprising a plurality of pixels having a brightness exceeding a predefined threshold;
- c) estimating position coordinates of a light source in the environment from the at least one area of increased brightness in the image;
- d) detecting a shadow of the vehicle in the image; and
- e) estimating a type of the light source as a spot light source or a direction light source from the shadow in the image, comprising the sub-steps:
  - e1) assigning the shadow to the light source based on edges of the shadow and the position coordinates of the light source,
  - e2) determining a parallelism of the edges of the shadow, and
  - e3) estimating the type of the light source from the parallelism of the edges of the shadow, wherein the type is estimated as the direction light source based on the edges of the shadow being parallel and the type is estimated as the spot light source based on the edges of the shadow being non-parallel.

11. The method according to claim 10, further comprising applying a Kalman smoothing filter to the position coordinates of the light source.

12. The method according to claim 10, wherein the camera arrangement is a surround-view camera arrangement comprising a plurality of cameras, and the image is a surround-view image.

13. The method according to claim 10, further comprising repeating the steps b) and c) or the steps d) and e) with respect to another light source in the environment.

14. The method according to claim 10, wherein the at least one area of increased brightness of the image is white-saturated.

15. The method according to claim 10, further comprising generating data indicative of the position coordinates and the type of the light source, using the data in compiling an output image representing the surrounding environment, and outputting the output image to a driver of the vehicle.

16. A control unit connected to the camera arrangement and configured to carry out the method according to claim 10.

17. A non-transitory computer-readable medium, on which is stored a program configured to cause the method according to claim 10 to be carried out when the program is executed on a control unit.

* * * * *